(12) United States Patent
Moon et al.

(10) Patent No.: US 8,269,930 B2
(45) Date of Patent: Sep. 18, 2012

(54) LIQUID CRYSTAL DISPLAY DEVICE HAVING WIDE VIEWING ANGLE

(75) Inventors: Jong-Won Moon, Gyeonggi-Do (KR); Kwang-Hoon Shin, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 297 days.

(21) Appl. No.: 12/649,868

(22) Filed: Dec. 30, 2009

(65) Prior Publication Data

US 2010/0165265 A1    Jul. 1, 2010

(30) Foreign Application Priority Data

Dec. 31, 2008  (KR) .................. 10-2008-0138699

(51) Int. Cl.
*G02F 1/1335* (2006.01)
(52) U.S. Cl. ...................................................... 349/119
(58) Field of Classification Search ................... 349/119
See application file for complete search history.

(56) References Cited

U.S. PATENT DOCUMENTS

| | | | |
|---|---|---|---|
| 2005/0200792 A1* | 9/2005 | Jeon et al. | 349/141 |
| 2005/0213019 A1* | 9/2005 | Choi et al. | 349/172 |
| 2006/0114383 A1* | 6/2006 | Kobayashi et al. | 349/117 |
| 2006/0285039 A1* | 12/2006 | Nam | 349/117 |
| 2007/0146585 A1* | 6/2007 | Ahn | 349/106 |
| 2007/0242188 A1* | 10/2007 | Sakai | 349/96 |
| 2009/0102993 A1* | 4/2009 | Choi et al. | 349/37 |
| 2010/0271573 A1* | 10/2010 | Sakai | 349/96 |
| 2010/0309414 A1* | 12/2010 | Tomonaga et al. | 349/96 |
| 2011/0051062 A1* | 3/2011 | Sakai | 349/120 |
| 2012/0026421 A1* | 2/2012 | Park et al. | 349/43 |

* cited by examiner

*Primary Examiner* — Timothy L Rude
(74) *Attorney, Agent, or Firm* — Morgan, Lewis & Bockius LLP

(57) ABSTRACT

Disclosed is a liquid crystal display device having a wide viewing angle, in which compensation films are disposed between a liquid crystal display panel and polarizers to change a polarized state of light, which is incident on the liquid crystal display panel and output therefrom through the polarizers, thereby preventing light from being leaked in a diagonal direction of the liquid crystal display device in a normally black mode.

21 Claims, 13 Drawing Sheets nx>ny=nz nx<ny=nz nx=ny<nz nx=ny>nz

BRIGHTNESS CONTOUR LINE

LIQUID CRYSTAL DISPLAY DEVICE HAVING WIDE VIEWING ANGLE

CROSS-REFERENCE TO RELATED APPLICATION

Pursuant to 35 U.S.C. §119(a), this application claims the benefit of earlier filing date and right of priority to Korean Application No. 10-2008-0138699, filed on Dec. 31, 2008, the contents of which is incorporated by reference herein in its entirety.

BACKGROUND OF THE INVENTION

1. Field of the Invention

The present invention relates to a liquid crystal display (LCD) device, and particularly, to an LCD device capable of improving a viewing angle characteristic by employing a plurality of biaxial optical films.

2. Background of the Invention

Recently, the development of various types of portable electric equipment, such as mobile phones, personal digital assistants (PDAs), and note book computers, is increasing the demands on flat panel display devices which are applicable to those equipment and small in size, light in weight and power-efficient. Examples of the flat panel display device are a liquid crystal display (LCD) device, a plasma display panel (PDP) device, a field emission display (FED) device, a vacuum fluorescent display (VFD) device and the like. Studies on those devices are actively conducted. Among others, the LCD device is currently in the limelight in view of its mass production technology, facilitation of driving scheme and implementation of high color rendering property.

Such LCD device implements various display modes according to alignment of liquid crystal molecules. However, TN mode LCD device is usually used in recent time by virtue of facilitation of white and black color rendering, fast response speed and low driving voltage. In the TN mode LCD device, when a voltage is applied, liquid crystal molecules having aligned parallel with a substrate are re-aligned almost perpendicularly to the substrate, which occurs a problem that a viewing angle becomes narrower when a voltage is applied due to a refractive anisotropy of the liquid crystal molecules.

To overcome the problem of the viewing angle, various modes of LCD devices having a wide viewing angle characteristic have been introduced in recent time. Among others, an In-Plane Switching (IPS) Mode LCD device has actually undergone for mass-production. The IPS-mode LCD device is configured such that at least a pair of electrodes aligned parallel with each other are formed in each pixel so as to create a transversal field actually parallel with a substrate, thus aligning liquid crystal molecules on a plane surface.

FIG. 1 is a view showing an IPS-mode LCD device according to the related art, wherein FIG. 1A is a plane view thereof and FIG. 1B is a sectional view taken along the line I-I' of FIG. 1A.

As shown in FIG. 1A, pixels of a liquid crystal display panel 1 are defined by gate lines 3 and data lines 4 arranged in horizontal and vertical directions. The drawings merely show $(n,m)^{th}$ pixel; however, n gate lines 3 and m data lines 4 are actually arranged on the liquid crystal display panel 1 so as to define n×m pixels on the whole liquid crystal display panel 1. A thin film transistor (TFT) 10 is formed at an intersection between the gate line 3 and the data line 4 in each pixel. The TFT 10 includes a gate electrode 11 to which a scan signal is applied via the gate line 3, a semiconductor layer 12 formed on the gate electrode 11 and activated responsive to the applied scan signal so as to form a channel layer, and a source electrode 13 and a drain electrode 14 formed on the semiconductor layer 12 and to which an image signal is applied via the data line 4. The thusly-constructed TFT 10 applies the image signal input from the exterior into a liquid crystal layer.

A plurality of common electrodes 5 and pixel electrodes 7 arranged to be substantially parallel with the data lines 4. Also, a common line 16 connected to the common electrodes 5 is disposed at the center of each pixel. A pixel electrode line 18 connected to the pixel electrodes 7 is disposed on the common line 16 so as to overlap the common line 16. As the common line 16 and the pixel electrode line 18 overlap each other, a storage capacitance is generated in the IPS-mode LCD device.

As such, in the IPS-mode LCD device having such construction, liquid crystal molecules are aligned to be substantially parallel with the common electrodes 5 and the pixel electrodes 7. When a signal is applied to the pixel electrodes 7 in cooperation with the TFTs 10 being driven, a transversal field substantially parallel with the liquid crystal display panel 1 is generated between the common electrodes 5 and the pixel electrodes 7. The liquid crystal molecules rotate on the same level along the transversal field, thereby preventing a gray scale inversion due to the refractive anisotropy thereof.

Hereinafter, the related art IPS-mode LCD device having such construction will be described in more detail with reference to FIG. 1B.

As shown in FIG. 1B, the gate electrode 11 is formed on a first substrate 20. A gate insulating layer 22 is laminated all over the first substrate 20. A semiconductor layer 12 is formed on the gate insulating layer 22, and the source electrode 13 and the drain electrode 14 are formed on the semiconductor layer 12. A passivation layer 24 is formed all over the first substrate 20. A first alignment layer 28a having a decided alignment direction for aligning liquid crystal molecules by a rubbing or the like, is formed on the passivation layer 24.

Further, a plurality of common electrodes 5 are formed on the first substrates 20, and the pixel electrode 7 and the data line 4 are formed on the gate insulating layer 22, thereby generating a transversal field E between the common electrode 5 and the pixel electrode 7.

A black matrix 32 and a color filter layer 34 are formed on a second substrate 30. The black matrix 32 serves to prevent light leakage into an area in which liquid crystal molecules are not operated. As shown in the drawings, the black matrix 32 is usually formed at a region of the TFT 10 and between pixels (that is, a region of gate line and data line). The color filter layer 34 is provided to render actual colors with red (R), green (G) and blue (B) colors. An overcoat layer 36 for protecting the color filter layer 34 and improving flatness of a substrate is formed on the color filter layer 34, and a second alignment layer 28b having decided alignment direction is formed on the overcoat layer 36.

A liquid crystal layer 40 is formed between the first substrate 20 and the second substrate 30, so as to completely form the liquid crystal display panel 1.

As aforementioned, in the IPS-mode LCD device, the transversal field is generated within the liquid crystal layer 40 by the common electrodes 5 and the pixel electrodes 7 respectively formed on the first substrate 20 and the gate insulating layer 22, accordingly the liquid crystal molecules within the liquid crystal layer 40 are rotated on the same level, thereby preventing the gray scale inversion due to the refractive anisotropy of the liquid crystal molecules.

However, the IPS-mode LCD device has the following problems. That is, in the IPS-mode LCD device, the liquid crystal molecules are rotated on the same level along the transversal field, so as to prevent the gray scale inversion due to the refractive anisotropy of the liquid crystal molecules and thusly improve a viewing angle characteristic in a vertical (up-and-down) direction or a horizontal (right-and-left) direction whereas not improving the viewing angle characteristic in a diagonal direction of a screen.

SUMMARY OF THE INVENTION

Therefore, an object of the present invention is to provide an LCD device capable of improving a viewing angle characteristic in a diagonal direction, by changing polarization property of light transmitted through the LCD device by use of a positive C-film and a positive biaxial film.

To achieve these and other advantages and in accordance with the purpose of the present invention, as embodied and broadly described herein, there is provided a liquid crystal display (LCD) device including, a liquid crystal display panel having a liquid crystal layer, a first polarizer and a second polarizer respectively located at upper and lower portions of the liquid crystal display panel to polarize incident light, a positive C-film disposed between the first polarizer and the liquid crystal display panel to change a polarized state of light, the positive C-film having a retardation value of Re=0 nm in a horizontal direction and a retardation value of Rth=−50~−200 nm in a thickness direction, and a positive biaxial film disposed between the liquid crystal display panel and the second polarizer to change a polarized state of light, the positive biaxial film having a retardation value of Re=80~160 nm in a horizontal direction and a retardation value of Rth=−24~−160 nm in a thickness direction, wherein $Re=(n_x-n_y)d$ and $Rth=(n_x-n_z)d$, where $n_x$, $n_y$ and $n_z$ respectively denote a refractive index in x-axial direction, a refractive index in y-axial direction and a refractive index in z-axial direction.

According to the present invention, the positive C-film and the positive biaxial film is disposed between the polarizers and the liquid crystal display panel so as to change polarization property of a polarized light incident on the liquid crystal display panel. The change in the polarization property allows an optical axis of light incident on the second polarizer to match with an absorption axis of the second polarizer, resulting in improvement of a viewing angle characteristic in a diagonal direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

A lowering of a viewing angle characteristic when viewing an LCD device in a diagonal direction is caused by light leakage in the diagonal direction of the LCD device, which will be described in detail, hereinafter.

Figure 1A:
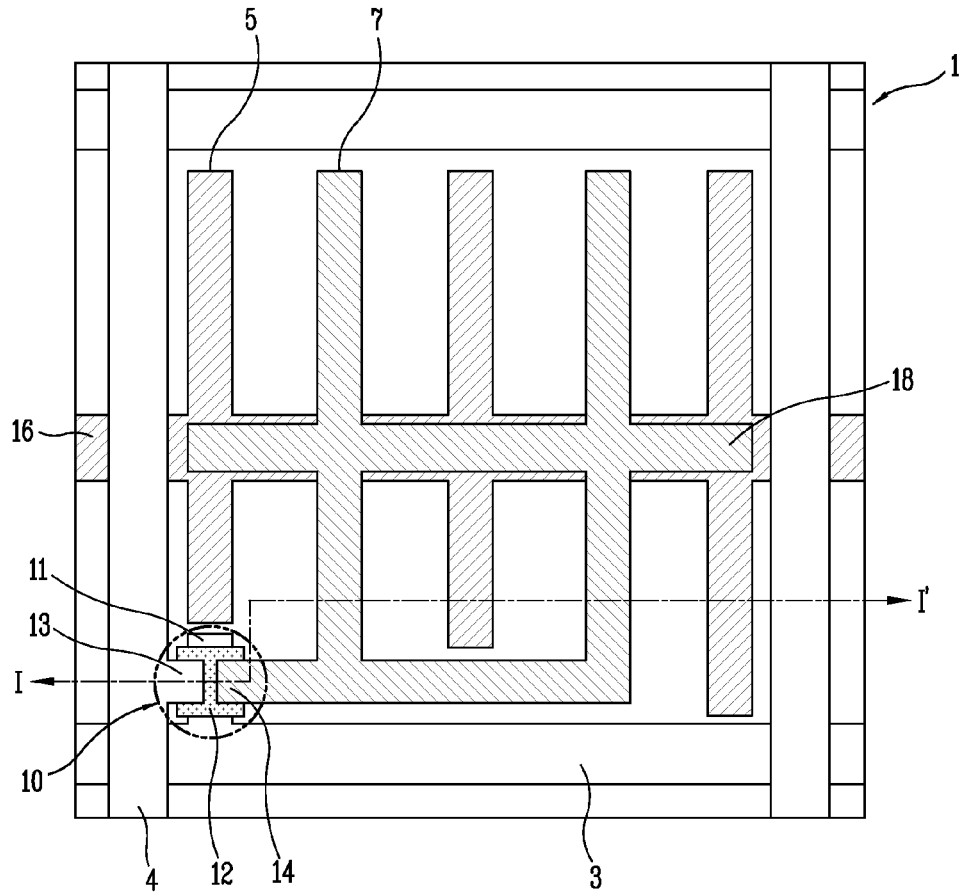
FIGS. 1A and 1B are views showing a structure of a typical IPS-mode LCD device.
Figure 1B:
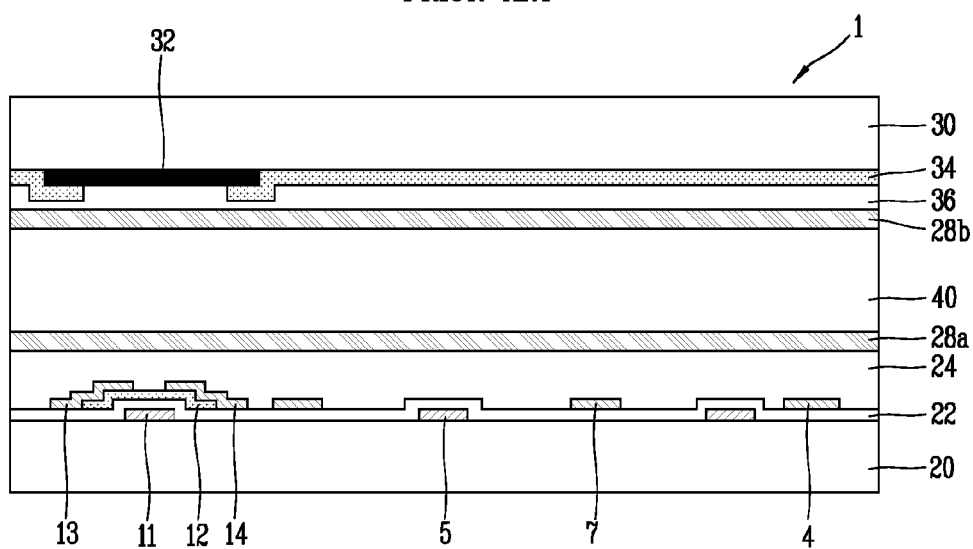
Figure 2:
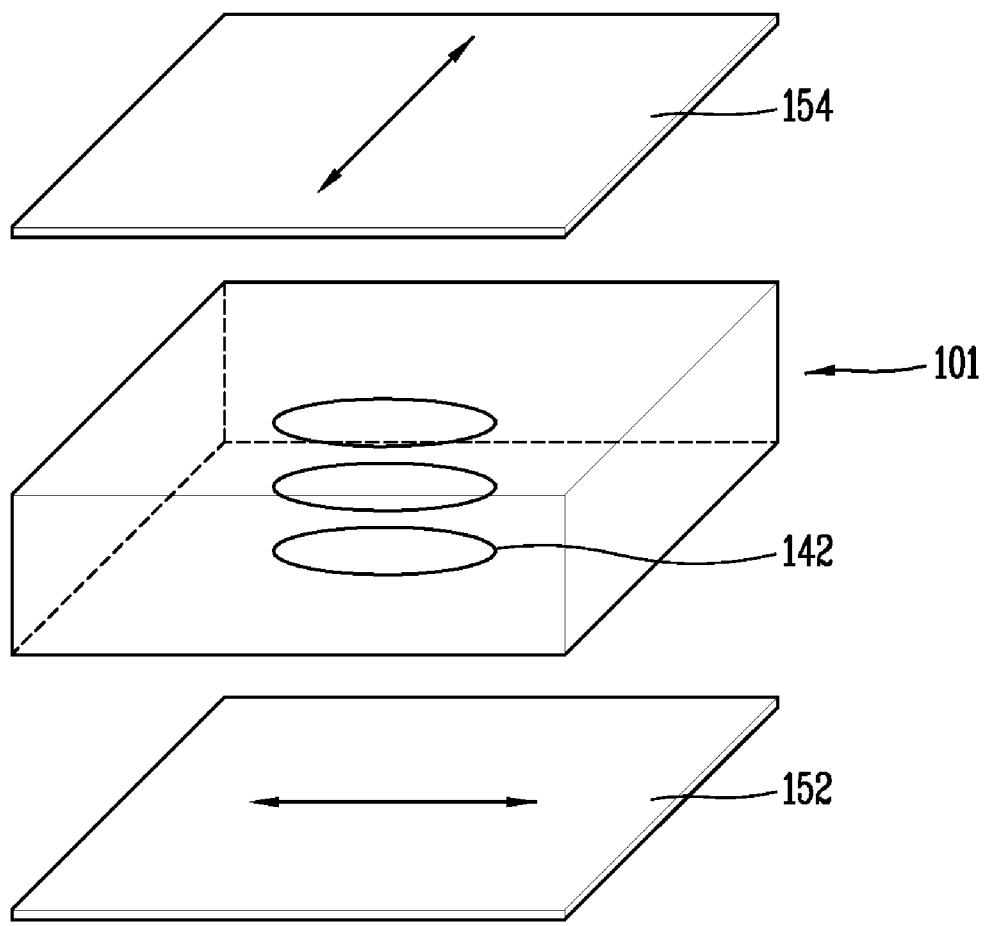
FIG. 2 is a perspective view briefly showing the structure of the related art LCD device.

As shown in FIG. 2, a first polarizer 152 and a second polarizer 154 are attached onto upper and lower portions of a liquid crystal (LC) panel 101 of a typical IPS-mode LCD device, so as to linearly polarize input and output light of the LC panel 101.

In a normally black mode, polarization axes of the first and second polarizers 152 and 154 attached onto the upper and lower substrates are perpendicular to each other. Hence, light transmitted through the first polarizer 152 is linearly polarized in an x-axial direction to be input into the LCD device. When no signal is applied to the LC panel 101, liquid crystal molecules 142 of the LC panel 101 are aligned toward the x-axial direction, accordingly light incident on the LC panel 101 is transmitted through the LC panel 101 in the linearly polarized state in the x-axial direction. Meanwhile, a polarization axis of the second polarizer 154 attached onto the upper substrate is perpendicular to a polarizing direction of light transmitted through a liquid crystal layer. Accordingly, light is all absorbed by the polarizer 154 of the upper substrate such that no light is output out of the second polarizer 152, resulting in rendering a screen entirely black.

However, when viewing the LCD device in a diagonal direction, the polarization directions of the first and second polarizers 152 and 154 are not disposed substantially perpendicular to each other. That is, the first and second polarizers 152 and 154 are perpendicular to each other when viewing the LCD device from a front side, while not being perpendicular when viewing the same in the diagonal direction.

Figure 3A:
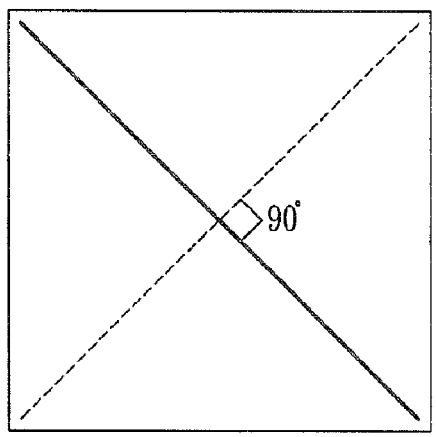
FIG. 3A is a view showing absorption axes of upper and lower polarizers when viewing an LCD device from a front side.
Figure 3B:
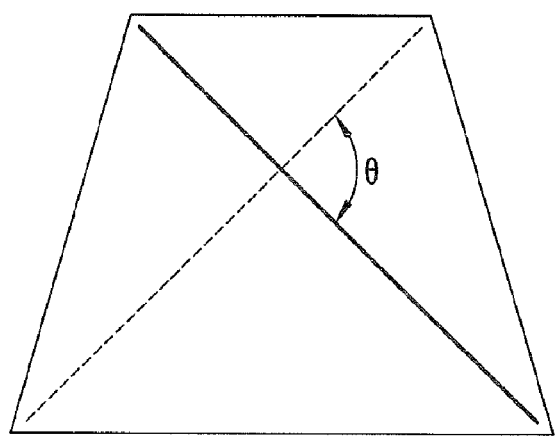
FIG. 3B is a view showing the absorption axes of the upper and lower polarizers when viewing the LCD device in a diagonal direction.

FIG. 3A shows that polarization axes of the first and second polarizers 152 and 154 arranged when viewing the LCD device from a front side, namely, on a path of light transmitted perpendicular to a screen of the LCD device, and FIG. 3B shows polarization axes of the first and second polarizers 152 and 154 arranged when viewing the LCD device in a diagonal direction, namely, on a path of light transmitted through the screen of the LCD device at a polar angle and at a azimuthal angle. Here, in the drawing, the dotted line denotes a direction of a polarization axis (i.e., light absorption axis) on the first polarizer 152 and a solid line denotes a direction of a light absorption axis on the second polarizer 154.

As shown in FIG. 3A, when viewing the LCD device from the front side (i.e., when light is perpendicularly transmitted through the screen of the LCD device), the polarization axes of the first and second polarizers 152 and 154 are perpendicular to each other. However, as shown in FIG. 3B, when viewing the LCD device in the diagonal direction (i.e., when light is transmitted through the screen of the LCD device at a preset polar angle and at a preset azimuthal angle, the polarization axes of the first and second polarizers 152 and 154 are not perpendicular to each other but disposed with a preset angle θ therebetween.

As such, when viewing the LCD device in the diagonal direction, since the polarization directions of the first and second polarizers 152 and 154 are not perpendicular to each other, light which has been linearly polarized at the first polarizer 152 and transmitted through the LC panel 101 is rather partially transmitted through the second polarizer 154 without being completely absorbed by the second polarizer 154. Therefore, even in the normally black state, when viewing the LCD device in the diagonal direction, light is partially leaked out, which makes it impossible to maintain a completely black state.

Thus, when viewing the LCD device in the diagonal direction, since the polarization directions of the first and second polarizers 152 and 154 are not perpendicular to each other and thereby the light polarized at the first polarizer 152 is partially leaked out without being completely absorbed by the second polarizer 154, a viewing angle characteristic is lowered. Hence, in order to improve the viewing angle characteristic when viewing the LCD device in the diagonal direction, light polarized at the first polarizer 152 should be completely absorbed by the second polarizer 154. To this end, in the present invention, a compensation film is used to change the polarization direction of light transmitted through the LC panel 101 so as to match optical axis of light incident on the second polarizer 154 with the polarization direction (i.e., light absorption layer) of the second polarizer 154.

The compensation film may be categorized into a uniaxial film and a biaxial film. The uniaxial film is an anisotropic birefringence film having a single optical axis, and the biaxial film is an anisotropic birefringence film having two optical axes. Of the compensation films, the uniaxial film may be divided into A-compensation film and C-compensation film according to direction and size of the optical axis. Refractive index characteristics of the A-compensation film and C-compensation film are shown in FIGS. 4 and 5.

Figure 4A:
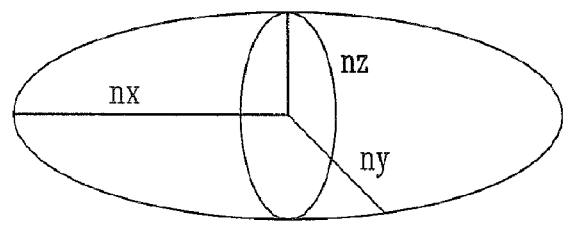
FIGS. 4A and 4B are views showing the relation of refractive indexed of A-compensation film in x, y and z-axial directions.
Figure 4B:
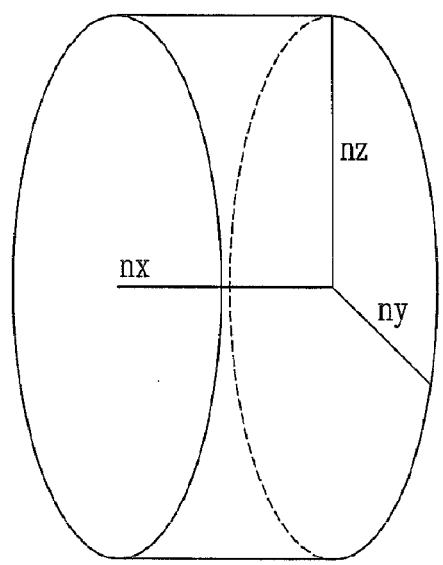

FIGS. 4A and 4B respectively show a positive A-compensation film and a negative A-compensation film. As shown in FIGS. 4A and 4B, the A-compensation film is characterized in that a refractive index $n_y$ in y-axial direction is the same to a refractive index $n_z$ in z-axial direction (i.e., $n_y=n_z$) and a refractive index $n_x$ in x-axial direction is different from the refractive indexes $n_y$ and $n_z$ in the y-axial direction and the z-axial direction (i.e., $n_x \neq n_y = n_z$). As shown in FIG. 4A, if the refractive index $n_x$ in the x-axial direction is greater than the refractive index $n_y$ in the y-axial direction, it is a positive A-compensation film. To the contrary, if the refractive index $n_x$ in the x-axial direction is smaller than the refractive index $n_y$ in the y-axial direction, it is a negative A-compensation film. The positive A-compensation film and the negative A-compensation film can be defined according to Equation 1 as follows.

$$n_x > n_y = n_z$$

$$n_x < n_y = n_z \qquad \text{[Equation 1]}$$

Figure 5A:
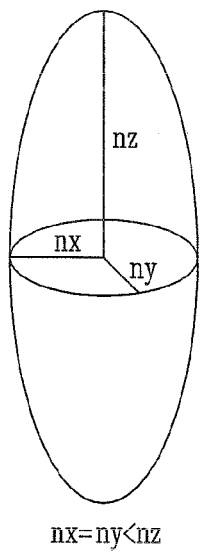
FIGS. 5a and 5B are views showing the relation of refractive indexed of C-compensation film in x, y and z-axial directions.
Figure 5B:
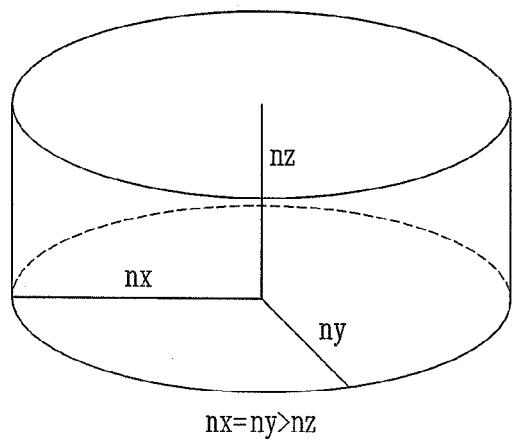

In the meantime, FIGS. 5A and 5B respectively show a positive C-compensation film and a negative C-compensation film. As shown in FIGS. 5A and 5B, the C-compensation film is characterized in that a refractive index $n_x$ in x-axial direction is the same to a refractive index $n_y$ in y-axial direction ($n_x=n_y$) and a refractive index $n_z$ in z-axial direction is different from the refractive indexes $n_x$ and $n_y$ in the x-axial direction and the y-axial direction (i.e., $n_z \neq n_x = n_y$). As shown in FIG. 5A, if the refractive index $n_x$ in the x-axial direction and the refractive index $n_y$ in the y-axial direction are smaller than the refractive index $n_z$ in the z-axial direction, it is a positive C-compensation film. To the contrary, if the refractive index $n_x$ in the x-axial direction and the refractive index $n_y$ in the y-axial direction are greater than the refractive index $n_z$ in the z-axial direction, it is a negative C-compensation film. The positive C-compensation film and the negative C-compensation film can be defined according to Equation 2 as follows.

$$n_x = n_y < n_z$$

$$n_x = n_y > n_z \qquad \text{[Equation 2]}$$

Also, retardation by the compensation films is determined according to the refractive index $n_x$ in the x-axial direction, the refractive index $n_y$ in the y-axial direction and the refractive index $n_z$ in the z-axial direction, the relation between the retardation and the refractive indexes $n_x$, $n_y$ and $n_z$ may be defined according to Equation 3.

$$Re=(n_x-n_y)d$$

$$Rth=(n_x-n_z)d \qquad \text{[Equation 3]}$$

where Re denotes a retardation value in a horizontal direction, and Rth denotes a retardation value in a thickness direction. Also, d denotes a thickness of a compensation film.

Examples of the A-compensation film and the C-compensation film may usually include cycloolefin polymer film, polycarbonate film, UV-curable horizontal or horizontally-aligned liquid crystal film, polystyrene resin and polyethylene terephthalate.

Figure 6:
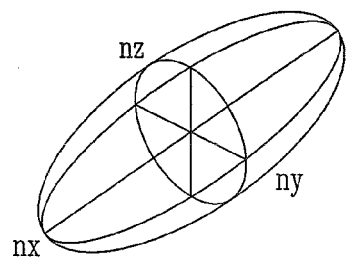
FIG. 6 is a view showing the relation of refractive indexed of a biaxial compensation film in x, y and z-axial directions.

The biaxial film may be categorized into a positive biaxial film, a negative biaxial film, and z-axis-stretched biaxial film. FIG. 6 shows refractive index $n_x$ in x-axial direction, refractive index $n_y$ in y-axial direction and refractive index $n_z$ in z-axial direction of the biaxial film. The biaxial film may be classified into a positive biaxial film, a negative biaxial film and a z-axis-stretched biaxial film according to the ratio of the refractive indexes $n_x$, $n_y$ and $n_z$ in the x, y and z-axial directions. The positive biaxial film, the negative biaxial film and the z-axis-stretched biaxial film can respectively be defined by Equation 4.

$$n_z > n_x > n_y$$

$$n_x > n_y > n_z$$

$$n_x > n_z > n_y \quad \text{[Equation 4]}$$

Also, Biaxiality of the biaxial film can be expressed according to Equation 5 as follows.

$$Nz = Rth/Re \quad \text{[Equation 5]}$$

As defined in Equation 3, Re denotes a retardation value in a horizontal direction, Rth denotes a retardation value in a thickness direction, and d denotes a thickness of a compensation film.

According to the definitions of Equations 4 and 5, the negative biaxial film is Nz>1, the positive biaxial film is Nz<0, and the z-axis-stretched biaxial film is 0<Nz<1.

In the present invention, the use of the compensation films allows light linearly polarized at the first polarizer 152 to be phase-transformed such that the polarization direction of the light can completely be perpendicular to the polarization direction of the second polarizer 154, thereby enabling complete absorption of light incident on the second polarizer 154.

The light polarized state can be analyzed by the Jones Matrix. According to the Jones calculation, since light reflection at a boundary surface is ignored, the Jones matrix exhibiting polarization transmission characteristics of transparent media is a unitary matrix, which can be expressed by the Poincare sphere.

The Jones vector can merely exhibit complete polarization. Thus, in order to exhibit partial polarization, strokes parameters defined according to the following Equation 6 should be used.

$$S_0 = <|E_x|^2> + <|E_y|^2>$$

$$S_1 = <|E_x|^2> - <|E_y|^2>$$

$$S_2 = 2|E_x||E_y|<\cos(\Phi_x - \Phi_y)>$$

$$S_3 = 2|E_x||E_y|<\sin(\Phi_x - \Phi_y)> \quad \text{[Equation 6]}$$

where < > denotes time average, and $E_x$ and $E_x$ denote magnetic field components in x-axial and y-axial directions. Here, an inequality of $S_0^2 ES_1^2 + S_2^2 + S_3^2$ is established among those four variables. This inequality is satisfied only for a complete polarization. That is, for the complete polarization, Equation 7 will be defined among standardized variables s1, s2 and s3, which are obtained by dividing S1, S2 and S3 by light brightness S0.

$$S_1^2 + S_2^2 + S_3^2 + 1 \quad \text{[Equation 7]}$$

This is an equation of the Poincare sphere having a radius of 1 in a three-dimensional space, wherein (s1, s2, s3) denote points of orthogonal coordinates of Poincare sphere.

Here, in the Poincare sphere, all points on the equator represent a linear polarized state, and the arctic corresponds to right-handed circular polarization and the Antarctic corresponds to left-handed circular polarization. Also, all points of the Northern hemisphere correspond to right-handed elliptical polarization, and all points of the Southern hemisphere correspond to left-handed elliptical polarization.

Figure 7A:
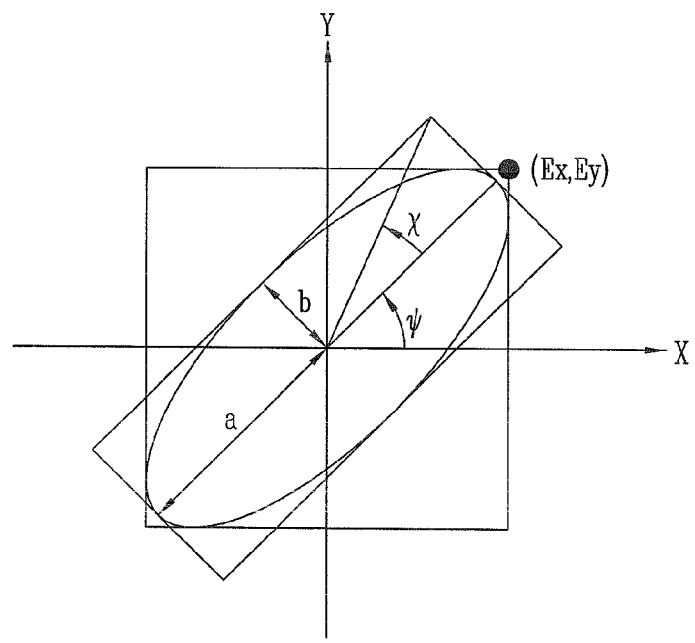
FIGS. 7A and 7B are an elliptical polarization of each light and corresponding Poincare vectors.
Figure 7B:
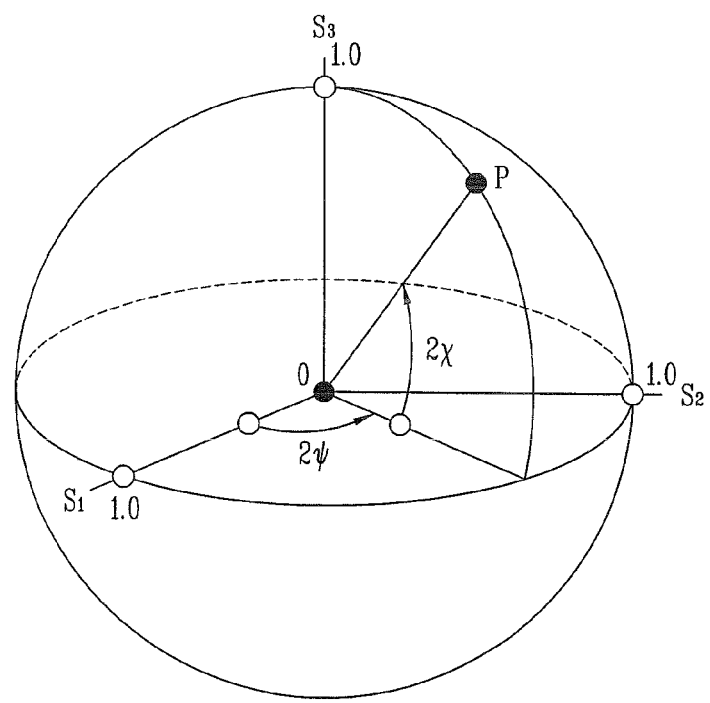

FIGS. 7A and 7B are views showing an arbitrary elliptical polarization in an orthogonal coordinate system and corresponding Poincare vector.

As shown in FIGS. 7A and 7B, for the Poincare vector P, corresponding to an elliptical polarization in which an azimuthal angle of a long axis thereof is Ψ and an elliptical angle is x, a latitude angle is 2x, an azimuthal angle is 2Ψ and orthogonal coordinates are (cons(2Ψ)cons(2x),sin(2Ψ)cos(2x),sin(2x)). If this point is located on the Northern hemisphere, an electric field vector is rotated in a clockwise direction, and if the point is located on the Southern hemisphere, the electric field vector is rotated in a counterclockwise direction. Here, antipodes on the Poincare sphere represent an orthogonally polarized state.

Further, the unitary Jones matrix representing the change in the polarized state when light passes through a transparent medium can be analyzed by a rotation conversion on the Poincare sphere.

Figure 8:
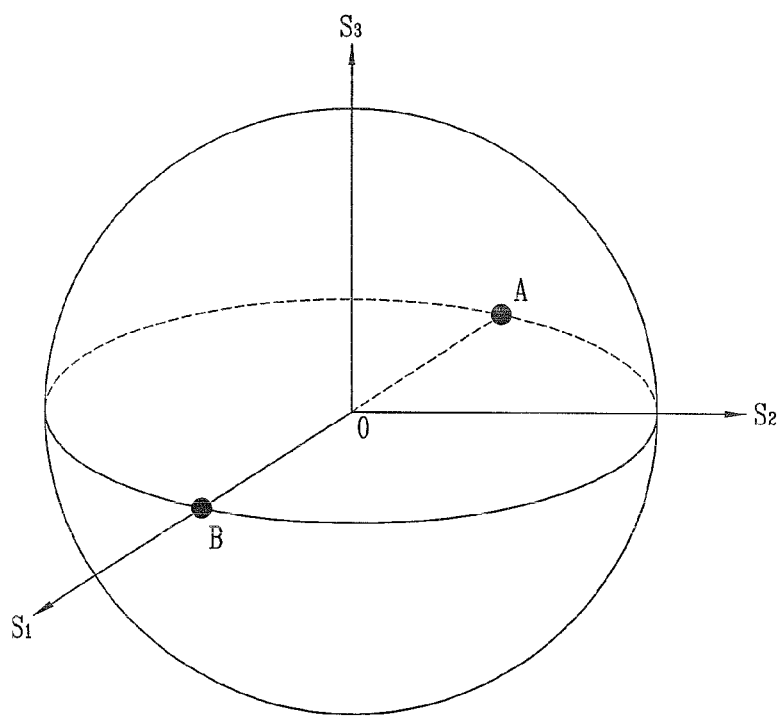
FIG. 8 is a view showing polarized states of light in Poincare sphere when viewing the LCD device from a front side.

FIG. 8 shows the Poincare sphere representing the polarized states of the first and second polarizers 152 and 154 when viewing the IPS-mode LCD device from a front side as shown in FIG. 3A.

Since the antipodes on the Poincare sphere represent the orthogonally polarized state, point A indicates a light absorption axis of the first polarizer 152 and a light transmission axis of the second polarizer 154, and point B indicates a light transmission axis of the first polarizer 152 and a light absorption axis of the second polarizer 154. As shown in FIG. 8, when viewing the IPS-mode LCD device from the front side, the light transmission axis of the first polarizer 152 maintains the same linearly polarized state to the light absorption axis of the second polarizer 154. Thus, since the light absorption axis of the first polarizer 152 is perpendicular to the light absorption axis of the second polarizer 154 when viewing the IPS-mode LCD device from the front side, the light transmission axis of the first polarizer 152 and the light absorption axis of the second polarizer 154 are parallel to each other.

As such, since the light transmission axis of the first polarizer 152 and the light absorption axis of the second polarizer 154 are parallel to each other and accordingly the light transmission axis of the first polarizer 152 and the light absorption axis of the second polarizer 154 are located at the same point, the linearly polarized light transmitted through the first polarizer 152 is all absorbed by the second polarizer 154 such that no light is externally transmitted through the second polarizer 154. Accordingly, in the normally black mode, when viewing the IPS-mode LCD device from the front side, the completely black state can be maintained.

Figure 9:
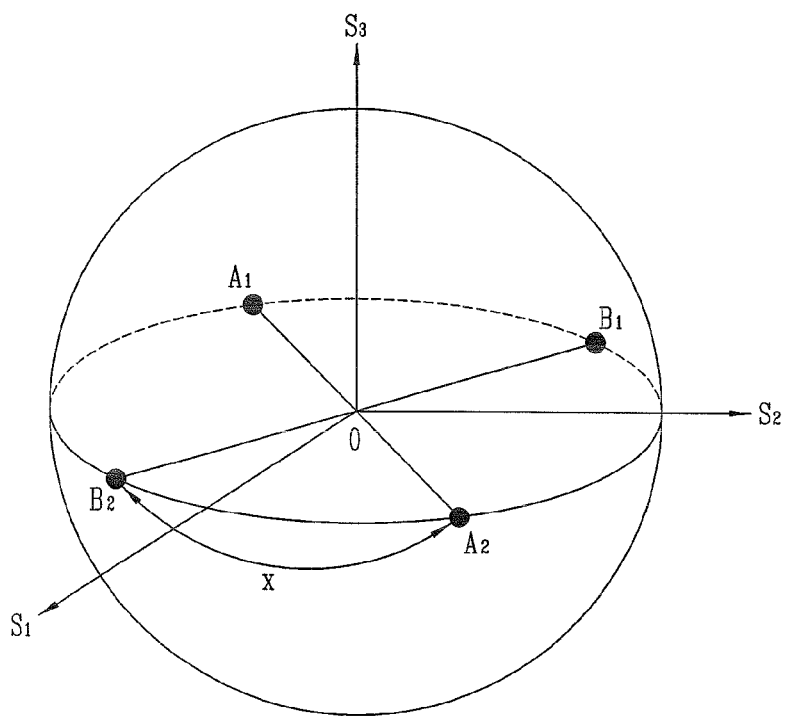
FIG. 9 is a view showing polarized states of light in Poincare sphere when viewing the LCD device in a diagonal direction.

In the meantime, FIG. 9 shows the Poincare sphere representing the polarized state of light when viewing the IPS-mode LCD device in a diagonal direction.

In FIG. 9, point A1 indicates a light absorption axis of the first polarizer 152 and the corresponding antipodal point A2 indicates a light transmission axis of the first polarizer 152 orthogonal to the light absorption axis. Also, point B1 indicates a light transmission axis of the second polarizer 154 and point B2 indicates a light absorption axis of the second polarizer 154. As shown in FIG. 3B, when viewing the IPS-mode LCD device in the diagonal direction, the polarization directions of the first polarizer 152 and the second polarizer 154 form a preset angle θ without being perpendicular to each other. Accordingly, the point A2 as the light transmission axis of the first polarizer 152 and the point B2 as the light absorption axis of the second polarizer 154 do not match but has an interval by x. The interval x indicates an angle between the light transmission axis of the first polarizer 152 and the light absorption axis of the second polarizer 154. Light as much as corresponding to the angle between the light transmission axis of the first polarizer 152 and the light absorption axis of the second polarizer 154 is transmitted through the second polarizer 154. Therefore, in order to prevent light leakage in the diagonal direction of the IPS-mode LCD device, the point A2 and the point B2 should match each other such that the light transmission axis of the first polarizer 152 is parallel to the light absorption axis of the second polarizer 154, whereby light polarized at the first polarizer 152 can completely be absorbed at the second polarizer 154.

In the present invention, the polarized state of light, which was linearly polarized at the first polarizer 152 is changed by use of the compensation films so as to match the point A2 with the point B2 in the Poincare sphere (i.e., the light transmission axis of the first polarizer 152 is allowed to be parallel to the light absorption axis of the second polarizer 154), thereby preventing the light leakage which may be caused due to light being transmitted through the second polarizer 154.

Hereinafter, detailed embodiments of the present invention will be described. Here, the polarized state of the LCD device in accordance with the embodiments of the present invention will be described by use of the Poincare sphere. As described above, the present invention is configured to change the polarized state of light by using the biaxial films so as to prevent the light leakage in the diagonal direction of the LCD device.

Figure 10:
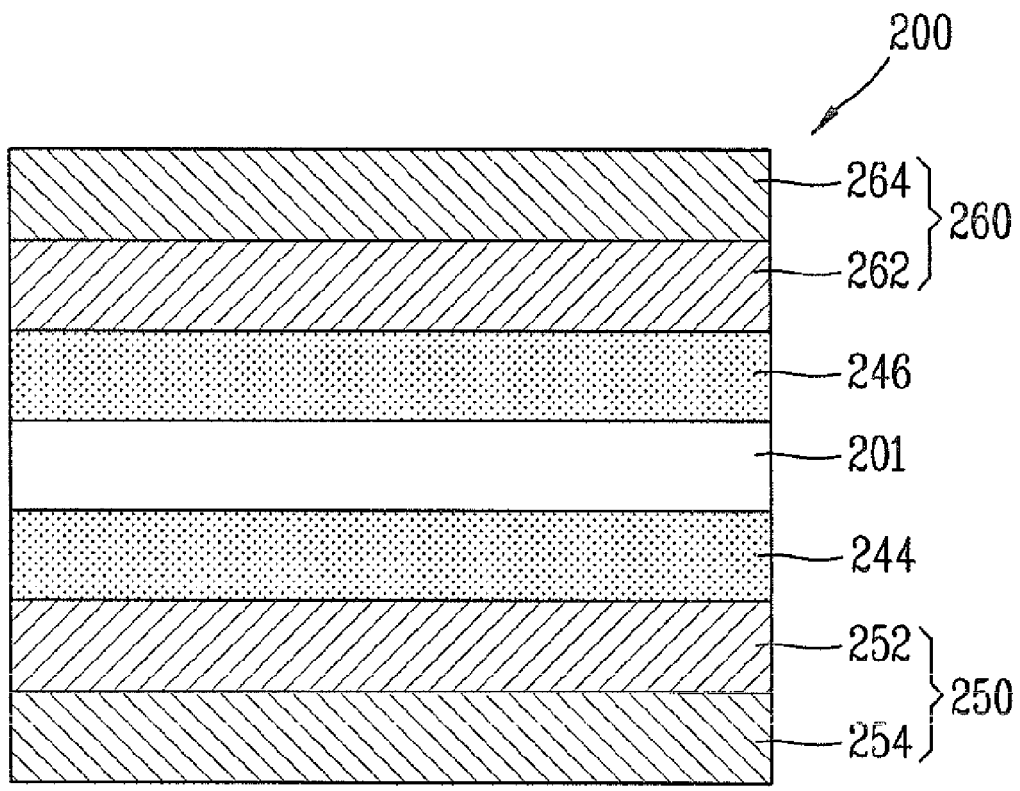
FIG. 10 is a view showing a structure of an LCD device in accordance with a first embodiment of the present invention.

FIG. 10 shows a structure of an LCD device in accordance with a first embodiment of the present invention.

As shown in FIG. 10, an LCD device 200 in accordance with a first embodiment of the present invention may include an LC panel 201 for implementing images, a first compensation film 244 and a second compensation film 246 attached onto upper and lower portions of the LC panel 201, respectively, a first polarizer 250 attached onto a lower portion of the first compensation film 244, and a second polarizer 260 attached onto an upper portion of the second compensation film 246.

Although not shown in the drawing in detail, the LC panel 201 may include a first substrate, a second substrate and a liquid crystal layer interposed between the first and second substrates. TFTs, patterns of gate lines and data lines and various electrodes may be formed on the first substrate, and a color filter layer rendering actual colors and a black matrix for preventing deterioration of image quality due to light leakage into an image non-display region may be formed on the second substrate.

Especially, the LC panel 201 according to the preset invention is an IPS-mode LC panel. Therefore, common electrodes and the pixel electrodes are disposed parallel to each other on the first substrate, thus to apply to the liquid crystal layer a magnetic field parallel to the surface of the substrate. Alternatively, a fringe field switching (FFS) mode LC panel may also be used as the LC panel 201 of the present invention. For the LC panel 201, a nematic liquid crystal having a retardation value of about 250~350 nm may be employed.

The first polarizer 250 may be provided with a first polarizing body 252 and a first supporting body 254. The first polarizing body 252 is a film which may convert natural light into an arbitrary polarized light. Here, the first polarizing body 252 may be one having a function that when dividing incident light into two orthogonal polarization components, one polarization component of the two is allowed to be transmitted and another one is absorbed, reflected or dispersed. Although there is not any specific limit to an optical film used in the first polarizing body 252, examples of the optical film may include a polymer film having as a main component a polyvinyl alcohol (PVA) based resin containing iodine or dichromatic dye, O-type polarizing body in which a liquid crystalline composition containing a dichromatic material and a liquid crystalline compound is aligned in a preset direction, E-type polarizing body in which lyotropic liquid crystal is aligned in a preset direction, and the like. The first supporting body 254 is to protect the first polarizer 252, and usually uses a typical protection film without retardation. Any can be used as the protection film, but usually triacetylcellulose (TAC) is used.

Also, the second polarizer 260 may be provided with a second polarizing body 262 and a second supporting body 264. The second polarizing body 262 may be made of the polyvinyl alcohol (PVA) based resin, similar to the first polarizing body 252. For the second supporting body 264, triacetylcellulose (TAC) is used as a transparent protection film The first compensation film 244 attached onto the lower portion of the LC panel 201 is a positive C-film as well as a uniaxial compensation film. Here, the C-film may usually be a UV-curable perpendicularly-aligned liquid crystal film, a biaxially-stretched polymer film or the like. Here, a retardation value Rth in the thickness direction of the positive C-film is Rth=−50 nm~−200 nm (Re=0).

Furthermore, the second compensation film 246 is a positive biaxial compensation film. A retardation value Re in a horizontal direction thereof is Re=80~160 nm and a retardation value Rth in a thickness direction thereof is Rth=−24~−160 nm. Therefore, biaxiality of the biaxial film of the second compensation film 246 becomes −2.0<Nz<0 based upon Equation 5. Typically, when the biaxiality Nz of the biaxial film is Nz<0, the biaxial film is a positive biaxial film and the ratio of refractive indexes $n_x$, $n_y$ and $n_z$ thereof in x, y and z-axial directions is $n_z>n_x>n_y$. Also, when the biaxiality Nz of the biaxial film is 0<Nz<1, the biaxial film is a z-axis-stretched biaxial film and the ratio of refractive indexes $n_x$, $n_y$ and $n_z$ thereof in x, y and z-axial directions is $n_x>n_z>n_y$. The first compensation film 246 is a positive biaxial film having biaxiality Nz of Nz<0.

Examples of the second compensation film 246, namely, the positive biaxial film may include UV-curable liquid crystal film polycarbonate, polyethylene terephthalate, polystyrene, uniaxially-stretched TAC, uniaxially-stretched polynorbonene (PNB), biaxially-stretched polycarbonate (PC), biaxially-stretched COP, biaxial LC film and the like. Also, the second compensation film 246 may have various characteristics of normal wavelength dispersion, flat wavelength dispersion and reverse wavelength dispersion.

An absorption axis of the first polarizer 250 is disposed at an angle of 90° and an absorption axis of the second polarizer 260 is disposed at an angle of 0°. Also, nx-axis of the second compensation film 246 is disposed at an angle of 0° and a rubbing direction of the LC panel 201 also forms an angle of 90°.

Liquid crystal molecules of the LC panel 201 are disposed along the rubbing direction of an alignment layer upon an off-state of the LC panel 201. Accordingly, an optical axis of the liquid crystal molecules also forms an angle of 90°. Thus, the reason why the LC panel 201 has a rubbing direction of 90° is described as follows.

Typically, common electrodes and pixel electrodes creating a lateral magnetic field in the IPS-mode LCD device are arranged along data lines, accordingly the rubbing direction of an alignment layer forms an angle of about 15°~45°.

Figure 11:
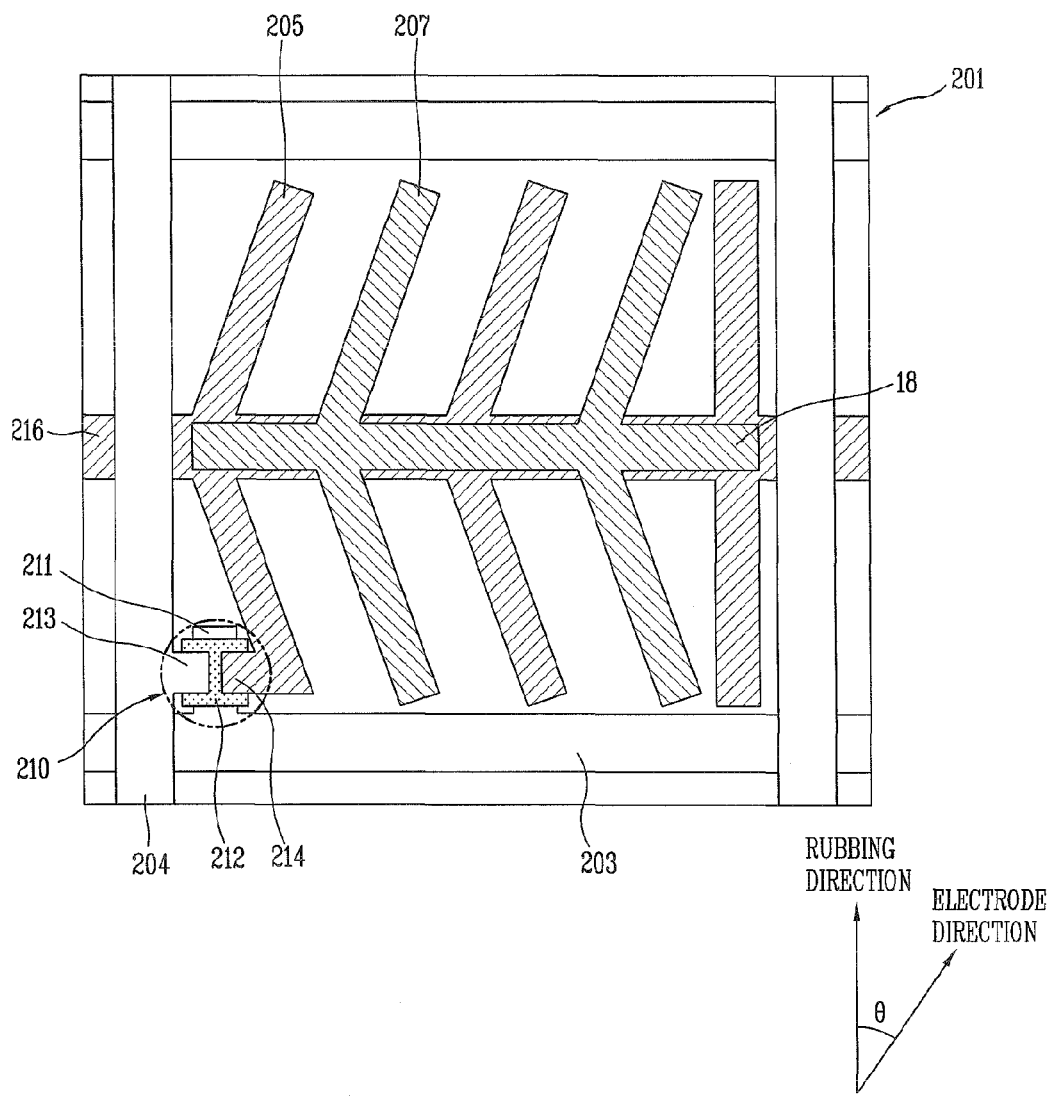
FIG. 11 is a sectional view showing a structure of an LC panel in accordance with the present invention.

However, as shown in FIG. 11, in the present invention, common electrodes 205 and pixel electrodes 207 of the IPS-mode LC panel 201 are curved at least once by a preset angle within a pixel defined by gate lines 203 and data lines 204, and a rubbing of an alignment layer is executed in a data line direction, namely, at an angle of 90°. That is, the direction of the electrodes 205 and 207 and the alignment direction form a preset angle θ.

As such, curving the common electrodes 205 and the pixel electrodes 207 is to form a plurality of domains having different main viewing angles within one pixel, thereby improving a viewing angle characteristic of the LCD device. The common electrode 205 and the pixel electrodes 207 are formed at a preset angle with the data line 204 and the rubbing of the alignment layer is executed in the data line direction. Accordingly, the rubbing direction of the common electrodes 205 and the pixel electrodes 207 forms a preset angle (for example, approximately, θ=15°~45°.

The present invention will not be limited to the IPS-mode LCD device having the above structure, but may be applicable to a FFS-mode LCD device having a rubbing direction of 90° and forming a preset angle between the disposed direction of electrodes and the rubbing direction.

Polarized states of the LCD device in accordance with the first embodiment having such structure will be described with reference to FIGS. 12A to 12C. Here, FIG. 12A shows a polarized state of each component of the LCD device according to the present invention, FIG. 12B shows the Poincare sphere representing the polarized states in the LCD device according to the present invention, and FIG. 12C is a two-dimensional view of FIG. 12B, namely, a protected view of the Poincare sphere.

Figure 12A:
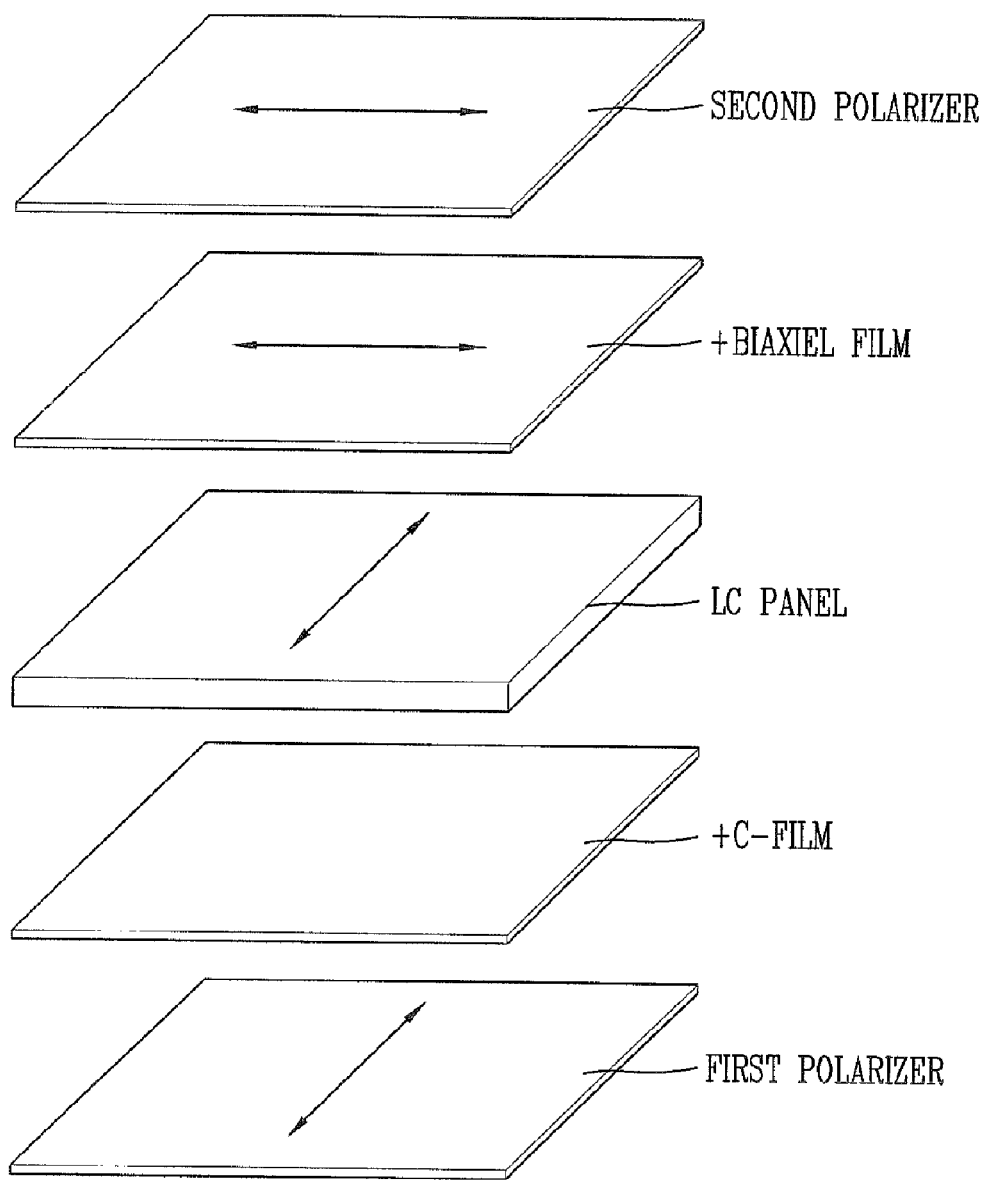
FIG. 12A is a view showing optical axes of the LCD device in accordance with the first embodiment of the present invention.

As shown in FIG. 12A, the first compensation film 244 implemented as a positive C-film is disposed between the first polarizer 250 and the LC panel 201. Also, the second polarizer 260 is disposed at an upper portion of the LC panel 201. Here, a light absorption axis of the second polarizer 260 is perpendicular to a rubbing direction of the LC panel 201 (i.e., the light absorption axis of the second polarizer 260 is formed at an angle of 0°). Also, the second compensation film 246 implemented as a positive biaxial film is disposed between the LC panel 201 and the second polarizer 260. Here, nx-axis of the second compensation film 246 is perpendicular to the rubbing direction of the LC panel 201, and parallel to the light absorption axis of the second polarizer 260 (i.e., the nx-axis forms an angle of 0°).

Figure 12B:
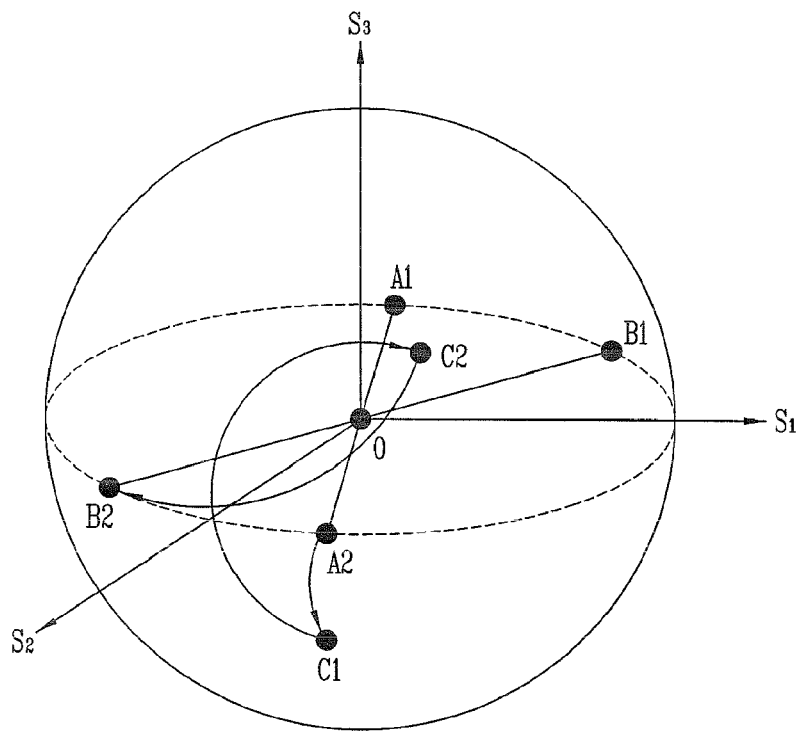
FIG. 12B is a view of the Poincare sphere representing polarized states of light in the LCD device in accordance with the first embodiment of the present invention.
Figure 12C:
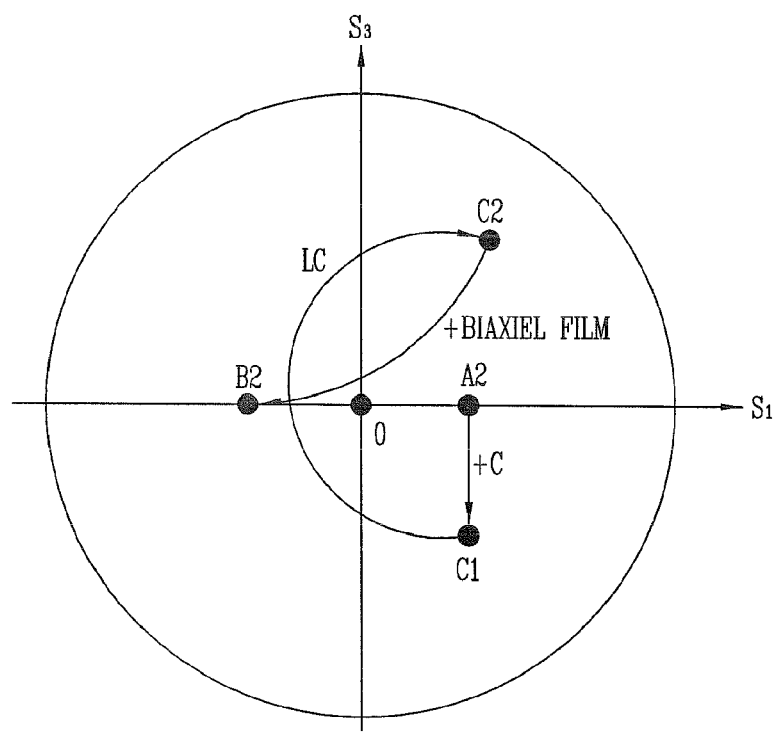
FIG. 12C is a projected view of FIG. 12B.

As shown in FIG. 12B, if non-polarized light is incident on the first polarizer 250 from a backlight of the LC panel 201, such light is linearly polarized. Most of the linearly polarized light is absorbed at the absorption axis (point A1) of the first polarizer 250 and the polarized state of the light transmitted through the first polarizer 250 is located at the point A2. That is, the transmission axis of the first polarizer 250 is located at the point A2. Here, the absorption axis of the second polarizer 260 is located at the point B2 so as to be spaced apart from the transmission axis of the first polarizer 250 by a preset distance.

If the light linearly polarized at the first polarizer 250 is transmitted through the first compensation film 244 implemented as the positive-C-film, the polarized state is rotated in a counterclockwise direction centering on axis S1 so as to be moved from the point A2 to a point C1. Here, the point C1 is located on the fourth quadrant of the Poincare sphere, thereby maintaining an elliptically polarized state.

The light transmitted through the positive C-film 246 becomes an elliptically polarized state. If the elliptically polarized light is transmitted through the LC panel 201, the polarized state of the LC panel 201 is located at the point A1 because the alignment layer is rubbed at an angle of 90°. Therefore, the polarized state is rotated in the counterclockwise direction centering on axis A20 so as to be moved from the point C1 to a point C2. Here, since the retardation value of the liquid crystal layer of the LC panel 201 is about 280 nm~350 nm, the light transmitted through the LC panel 201 is rotated in a clockwise direction at an angle of about 183°~229° centering around the axis A20. Here, the polarized state of the light maintains the elliptically polarized state, which is located at the first quadrant of the Poincare sphere.

If light transmitted through the LC panel 201 is then transmitted through the second compensation film 246 implemented as the positive biaxial film, the polarized state is rotated from the point C2 to the point B2. Here, since the second compensation film 246 is the positive biaxial film, an optical axis exists between $n_y$-axis and $n_z$-axis. Accordingly, the polarized state of the light is rotated based upon the optical axis between $n_y$-axis and $n_z$-axis, so that the polarized state is moved from the point C2 and the point B2. Consequently, the light transmitted through the second compensation film 246 is changed into linearly polarized light with the same polarization axis to the absorption axis of the second polarizer 260. This polarized light is all absorbed by the second polarizer 260, resulting in preventing the light from being transmitted through the second polarizer 260.

As shown in FIG. 12C, the polarized state (corresponding to the point A2) of the linearly polarized light at the first polarizer 250 is changed by the positive C-film 244 and the LC panel 201 and finally matches with the point B2 by the positive biaxial film 246. Accordingly, the optical axis of the light incident on the second polarizer 260 matches with the absorption axis of the second polarizer 260 such that light polarized at the first polarizer 250 is all absorbed by the second polarizer 260, thereby preventing light leakage in the diagonal direction.

Figure 13:
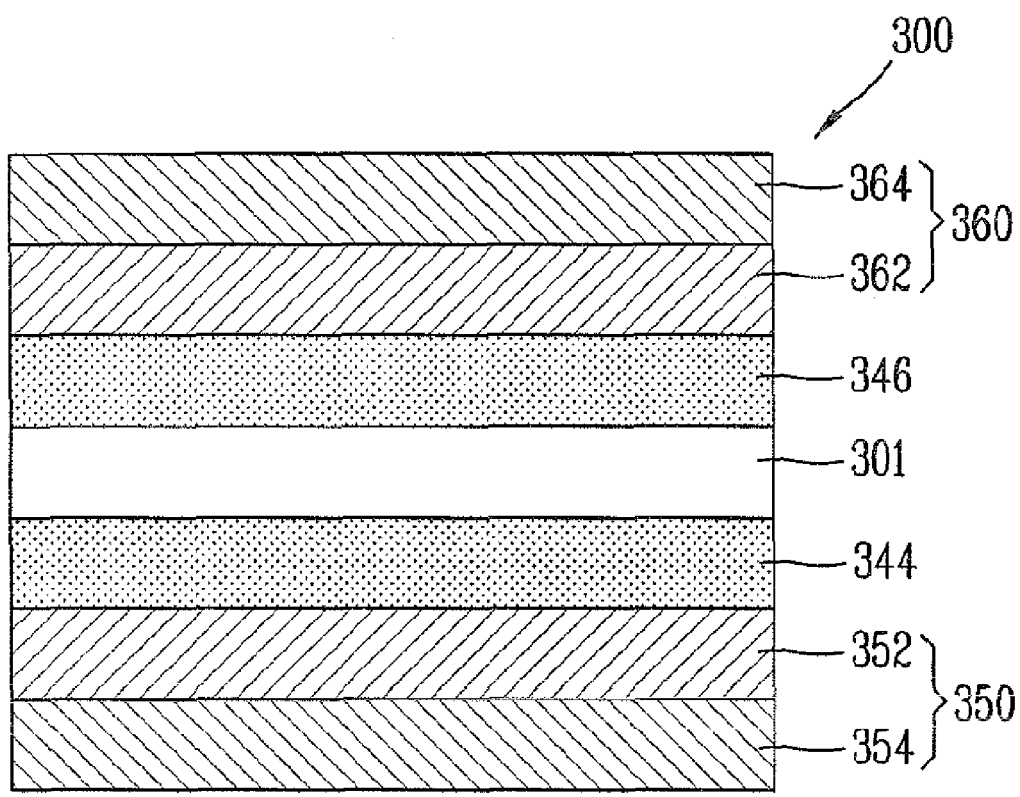
FIG. 13 is a view showing a structure of an LCD device in accordance with a second embodiment of the present invention.

FIG. 13 is a view showing a structure of an LCD device 300 in accordance with a second embodiment of the present invention, wherein the structure shown in this embodiment is similar to the structure of the LCD device shown in FIG. 10.

That is, an LCD device 300 according to the second embodiment may include an LC panel 301 for implementing images, a first compensation film 344 implemented as a positive C-film attached onto a lower portion of the LC panel 301, a second compensation film 346 implemented as a positive biaxial film attached onto an upper portion of the LC panel 301, a first polarizer 350 attached onto a lower portion of the first compensation film 344, and a second polarizer 360 attached onto an upper portion of the second compensation film 346.

That is, the LCD device according to the first embodiment and the LCD device according to the second embodiment are substantially the same in the structure excluding the optical axes. That is, the LCD device according to the first embodiment is configured such that an absorption axis of the first polarizer 250 is 90° and an absorption axis of the second polarizer 260 is 0°, while the LCD device according to the second embodiment is configured such that an absorption axis of the first polarizer 350 is 0° and the absorption axis of the second polarizer 360 is 90°. Also, nx-axis of the second compensation film 246 is 0° in the first embodiment while nx-axis of the second compensation film 346 is 90° in the second embodiment.

Even regarding the LCD device according to the second embodiment having such configuration, as light is transmitted, a polarized state of light is changed by the positive C-film 344 and the LC panel 301 in the Poincare sphere shown in FIG. 12B, and finally an optical axis of the light matches with an absorption axis of the second polarizer 360 due to the positive biaxial film 346. Consequently, light polarized at the first polarizer 350 is all absorbed by the second polarizer 360, thereby preventing light leakage in the diagonal direction.

Figure 14A:
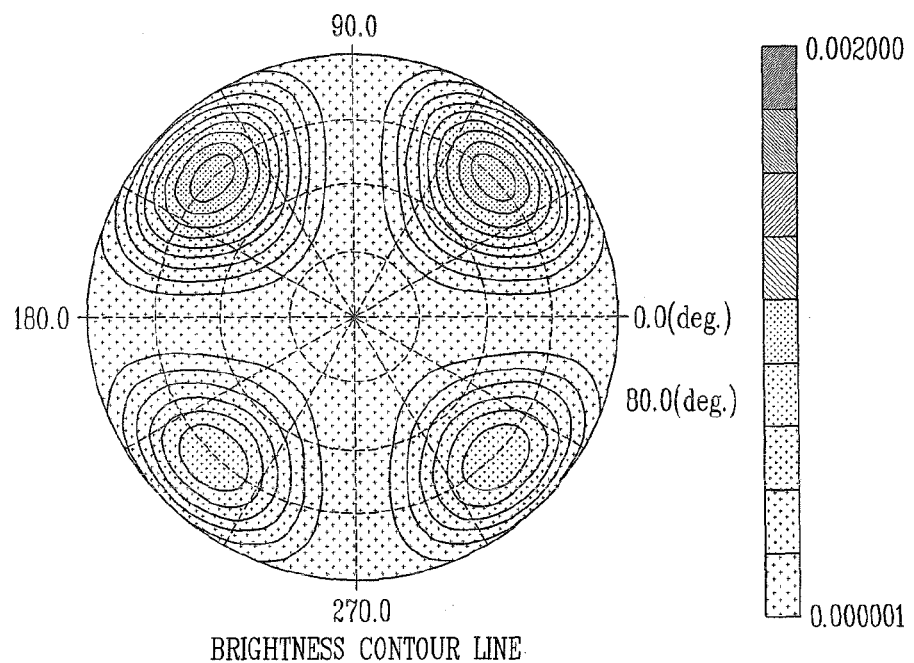
FIGS. 14A and 14B are views respectively showing viewing angle characteristics when viewing the related art LCD device and the LCD device according to the present invention in a diagonal direction.
Figure 14B:
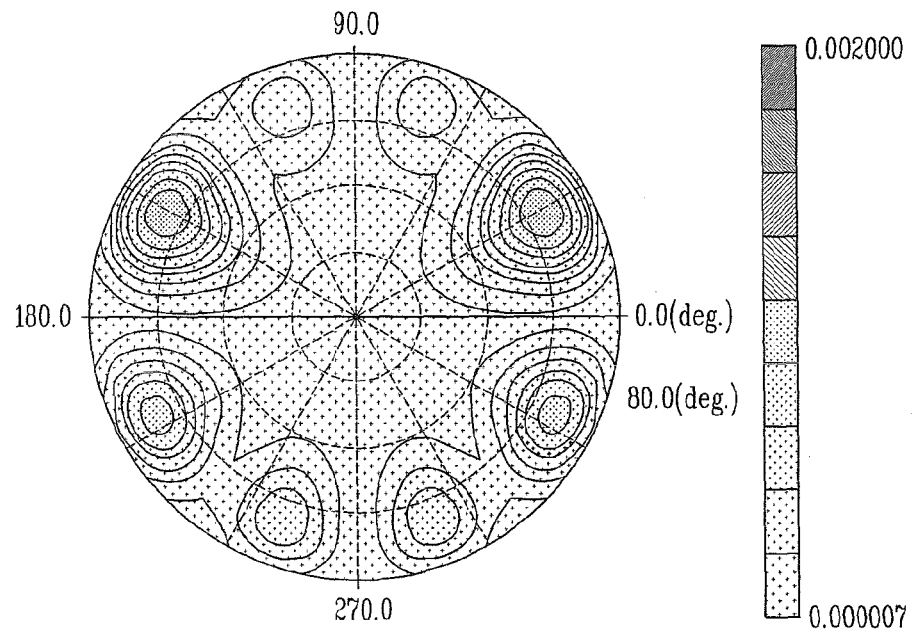

FIG. 14A shows the result of simulating a viewing angle characteristic in a normally black mode in a direction of a diagonal viewing angle of the related art LCD device, and FIG. 14B shows the result of simulating a viewing angle characteristic in a normally black mode in a direction of a diagonal viewing angle of the LCD device according to the present invention.

Here, the lower polarizer and the upper polarizer are disposed such that optical axes thereof can be orthogonal to each other, and an optical axis of the liquid crystal layer is parallel with a light transmission axis of the lower polarizer. Here, FIGS. 14A and 14B are results of simulating contrast characteristics, at an inclination angle in the range of 0~80° with respect to all radius vector angles (or azimuthal angles) when using white-tone light, for the related art LCD device and an LCD device having an optical compensation film according to the present invention. In FIGS. 14A and 14B, a center of a circle may have an inclination angle of 0°. As a radius of the circle increases, the inclination angle becomes larger. Also, the numerals represented along a circumference denote radius vector angles.

Comparing the contrast characteristic of the related art LCD device shown in FIG. 14A with that of the LCD device according to the present invention shown in FIG. 14B, it can be observed in the normally black mode that light leakage has been remarkably reduced at angles of 45°, 135°, 225° and 315° corresponding to the diagonal direction of the LC panel. Here, a maximum transmittancy Tmax is Tmax=0.00192 in the diagonal viewing angle direction of the related art LCD device, whereas the maximum transmittancy Tmax is Tmax=0.000188 in the diagonal viewing angle direction of the LCD device of the present invention having the positive C-film and the positive biaxial film. Therefore, it can be noticed that the transmittancy in the diagonal viewing angle direction of the LCD device according to the present invention has been remarkably reduced as compared to the related art LCD device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
a liquid crystal display panel having a liquid crystal layer;
a first polarizer and a second polarizer respectively disposed at upper and lower portions of the liquid crystal display panel to polarize light;
a positive C-film disposed between the first polarizer and the liquid crystal display panel to change a polarized state of light, the positive C-film having a retardation value of Re=0 nm in a horizontal direction and a retardation value of Rth=−50~−200 nm in a thickness direction; and
a positive biaxial film disposed between the liquid crystal display panel and the second polarizer to change a polarized state of light, the positive biaxial film having a retardation value Re=80~160 nm in a horizontal direction and a retardation value of Rth=−24~−160 nm in a thickness direction,
wherein Re=$(n_x-n_y)d$ and Rth=$(n_x-n_z)d$, where $n_x$, $n_y$ and $n_z$ respectively denote a refractive index in x-axial direction, a refractive index in y-axial direction and a refractive index in z-axial direction.

2. The device of claim 1, wherein absorption axes of the first polarizer and the second polarizer are perpendicular to each other.

3. The device of claim 1, wherein the first polarizer comprises:
a first supporting body; and
a first polarizing body having one surface attached onto the first supporting body.

4. The device of claim 3, wherein the first supporting body is formed of a transparent protection film.

5. The device of claim 4, wherein the transparent protection film is formed of triacetylcellulose.

6. The device of claim 3, wherein the first polarizer is formed of a polyvinyl alcohol (PVA) based resin.

7. The device of claim 3, wherein the first polarizer comprises:
a first polarizing body; and
a first supporting body disposed between the first polarizer and the positive C-film, the first supporting body being formed of triacetylcellulose without retardation Rth.

8. The device of claim 1, wherein the second polarizer comprises:
a second supporting body; and
a second polarizing body having one surface attached onto the second supporting body.

9. The device of claim 8, wherein the second supporting body is formed of a transparent protection film.

10. The device of claim 9, wherein the transparent protection film is formed of triacetylcellulose.

11. The device of claim 8, wherein the second polarizer is formed of a polyvinyl alcohol (PVA) based resin.

12. The device of claim 1, wherein the positive C-film is formed of a UV-curable perpendicularly-aligned liquid crystal film or a biaxially-stretched polymer film.

13. The device of claim 1, wherein the positive biaxial film is formed of a material selected from a group consisting of UV-curable liquid crystal film polycarbonate, polyethylene terephthalate, polystyrene, uniaxially-stretched TAC, uniaxially-stretched polynorbonene (PNB), biaxially-stretched polycarbonate (PC), biaxially-stretched COP, and biaxial LC film.

14. The device of claim 1, wherein nx-axis of the positive biaxial film is parallel to a light absorption axis of the second polarizer.

15. The device of claim 1, wherein the rubbing direction of the liquid crystal display panel is parallel to a light absorption axis of the first polarizer.

16. The device of claim 1, wherein a non-polarized light is incident through the first polarizer.

17. The device of claim 1, wherein a non-polarized light is incident through the second polarizer.

18. The device of claim 1, wherein the liquid crystal display panel is either an in-plane switching (IPS) mode liquid crystal display panel or a fringe field switching (FFS) mode liquid crystal display panel.

19. The device of claim 1, wherein the positive C-film is formed of a UV-curable perpendicularly-aligned liquid crystal film.

20. The device of claim 1, wherein the positive biaxial film is formed of UV-curable liquid crystal film polycarbonate.

21. The device of claim 1, wherein the liquid crystal display panel is an in-plane switching (IPS) mode liquid crystal display panel.

* * * * *